US010319391B2

(12) United States Patent
Gunawan et al.

(10) Patent No.: US 10,319,391 B2
(45) Date of Patent: Jun. 11, 2019

(54) IMPULSIVE NOISE SUPPRESSION

(71) Applicant: Dolby Laboratories Licensing Corporation, San Francisco, CA (US)

(72) Inventors: David Gunawan, Sydney (AU); Dong Shi, Shanghai (CN); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/569,555

(22) PCT Filed: Apr. 27, 2016

(86) PCT No.: PCT/US2016/029569
§ 371 (c)(1),
(2) Date: Oct. 26, 2017

(87) PCT Pub. No.: WO2016/176329
PCT Pub. Date: Nov. 3, 2016

(65) Prior Publication Data

US 2018/0301157 A1 Oct. 18, 2018

Related U.S. Application Data

(60) Provisional application No. 62/160,504, filed on May 12, 2015.

(30) Foreign Application Priority Data

Apr. 28, 2015 (CN) .......................... 2015 1 0208739

(51) Int. Cl.
*H04B 15/00* (2006.01)
*G10L 21/0208* (2013.01)
(Continued)

(52) U.S. Cl.
CPC ........ *G10L 21/0208* (2013.01); *G10L 21/034* (2013.01); *H04R 1/326* (2013.01); *G10L 25/48* (2013.01); *H04R 2410/03* (2013.01)

(58) Field of Classification Search
CPC .... G10L 21/0208; G10L 21/034; H04R 1/326
See application file for complete search history.

(56) References Cited

U.S. PATENT DOCUMENTS 7,725,315 B2 5/2010 Hetherington
8,515,097 B2 8/2013 Nemer
(Continued)

FOREIGN PATENT DOCUMENTS

JP 2836271 12/1998
WO 2014/136629 9/2014

OTHER PUBLICATIONS

Cohen, I. et al "Microphone Array Post-Filtering for Non-Stationary Noise Suppression" IEEE International Conference on Acoustics, Speech, and Signal Processing, May 13-17, 2002, pp. I-901-I-904.
(Continued)

*Primary Examiner* — Simon King

(57) ABSTRACT

Example embodiments disclosed herein relate to impulsive noise suppression. A method of impulsive noise suppression in an audio signal is disclosed. The method includes determining an impulsive noise related feature from a current frame of the audio signal. The method also includes detecting an impulsive noise in the current frame based on the impulsive noise related feature, and in response to detecting the impulsive noise in the current frame, applying a suppression gain to the current frame to suppress the impulsive noise. Corresponding system and computer program product of impulsive noise suppression in an audio signal are also disclosed.

20 Claims, 5 Drawing Sheets

(51) Int. Cl.

| | |
|---|---|
| ***G10L 21/034*** | (2013.01) |
| ***H04R 1/32*** | (2006.01) |
| *G10L 25/48* | (2013.01) |

(56) References Cited

U.S. PATENT DOCUMENTS

| | | | | |
|---|---|---|---|---|
| 8,606,572 | B2 | 12/2013 | Zhu | |
| 8,656,415 | B2 | 2/2014 | Wihardja | |
| 8,682,006 | B1 | 3/2014 | Laroche | |
| 8,775,171 | B2 | 7/2014 | Sorensen | |
| 2007/0076896 | A1 | 4/2007 | Hosaka | |
| 2010/0103776 | A1 | 4/2010 | Chan | |
| 2010/0145689 | A1* | 6/2010 | Li | G10L 21/0208 704/210 |
| 2010/0296665 | A1 | 11/2010 | Ishikawa | |
| 2011/0103615 | A1 | 5/2011 | Sun | |
| 2013/0142343 | A1 | 6/2013 | Matsui | |
| 2014/0148224 | A1 | 5/2014 | Truong | |
| 2014/0341386 | A1 | 11/2014 | Cimaz | |
| 2016/0019914 | A1 | 1/2016 | Sugiyama | |

OTHER PUBLICATIONS

Zheng, C. et al "Delayless Method to Suppress Transient Noise Using Speech Properties and Spectral Coherence" AES presented at the 135th Convention, Oct. 17-20, 2013, New York, USA, pp. 1-7.

* cited by examiner

IMPULSIVE NOISE SUPPRESSION

CROSS-REFERENCE TO RELATED REFERENCES

This application claims priority from Chinese Patent Application No. 201510208739.6, filed Apr. 28, 2015 and United States Provisional Patent Application No. 62/160,504 filed May 12, 2015, which are both hereby incorporated by reference in their entirety.

TECHNOLOGY

Example embodiments disclosed herein generally relate to audio signal processing, and more specifically, to a method and system for impulsive noise suppression in an audio signal.

BACKGROUND

Communication systems such as those employed in a telephone conferencing system, telephony systems or in audio recording systems often operate in noisy environments. In these scenarios, noise signals may be captured by the systems together with the desired audio data. Typical noise signals can be classified as stationary and non-stationary noises. Stationary noise includes noise that exists for long time duration and exhibits relatively stable characteristics. On the other hand, non-stationary noise includes noise that has the characteristic of varying rapidly with time. An example of stationary noise is the background noise in a room where a capture device is located. An example of a non-stationary noise is the clicking sound caused by pressing a mechanical button (for example, a mute button) on a capture device, which is represented as a short-term burst presented in a captured signal.

It is generally necessary to process a captured signal to suppress the stationary and non-stationary noises in order to improve perceptual quality in the playback. As stationary background noises have stable characteristics and can be predicated more easily, there have been many noise suppression algorithms studied and applied to effectively remove them from the captured signal. However, since non-stationary noise (for example, impulsive noises) have characteristics varying rapidly, they are relatively harder to be suppressed or even reliably detected from a captured signal.

At present, one existing solution for impulsive noise suppression involves simply dividing frames of a captured signal into speech frames or non-speech frames by means of voice activity detection and then applying a suppression gain to the non-speech frames only. It relies on the assumption that non-speech frames have less possibility to contain valuable audio data which is not practical in the case where speech frames contain impulsive noise. As a result, this solution has a higher error rate for noise suppression and an increased impact on speech quality. Latency of audio signal analysis may allow a better decision to be made using future frames to help decide whether to suppress the current frame. However, the introduced latency is generally not acceptable in interactive voice or communication applications.

SUMMARY

In order to address the foregoing and other potential problems, example embodiments disclosed herein propose a method and system of impulsive noise suppression in an audio signal.

In one aspect, example embodiments disclosed herein provide a method of impulsive noise suppression in an audio signal. The method includes determining an impulsive noise related feature from a current frame of the audio signal. The method also includes detecting an impulsive noise in the current frame based on the impulsive noise related feature, and in response to detecting the impulsive noise in the current frame, applying a suppression gain to the current frame to suppress the impulsive noise. Embodiments in this regard further include a corresponding computer program product.

In another aspect, example embodiments disclosed herein provide a system of impulsive noise suppression in an audio signal. The system includes a feature determination unit configured to determine an impulsive noise related feature from a current frame of the audio signal. The system also includes a noise detection unit configured to detect an impulsive noise in the current frame based on the impulsive noise related feature, and a noise suppression unit configured to apply a suppression gain to the current frame in response to detecting the impulsive noise in the current frame so as to suppress the impulsive noise.

Through the following description, it would be appreciated that in accordance with example embodiments disclosed herein, presence of an impulsive noise is detected in each frame of an input audio signal based on distinctive features of the impulsive noise extracted from the audio signal, and noise suppression is performed on the current frame when an impulsive noise is detected. Since noise suppression is performed on respective frames of the audio signal where impulsive noises are detected, an efficiency of impulsive noise removal is increased and impacts on speech quality are reduced. Additionally, the feature extraction and noise suppression is based on the current frame without looking ahead, which introduces less processing latency. Other advantages achieved by example embodiments disclosed herein will become apparent through the following descriptions.

DESCRIPTION OF DRAWINGS

Through the following detailed description with reference to the accompanying drawings, the above and other objectives, features and advantages of example embodiments disclosed herein will become more comprehensible. In the drawings, several example embodiments disclosed herein will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
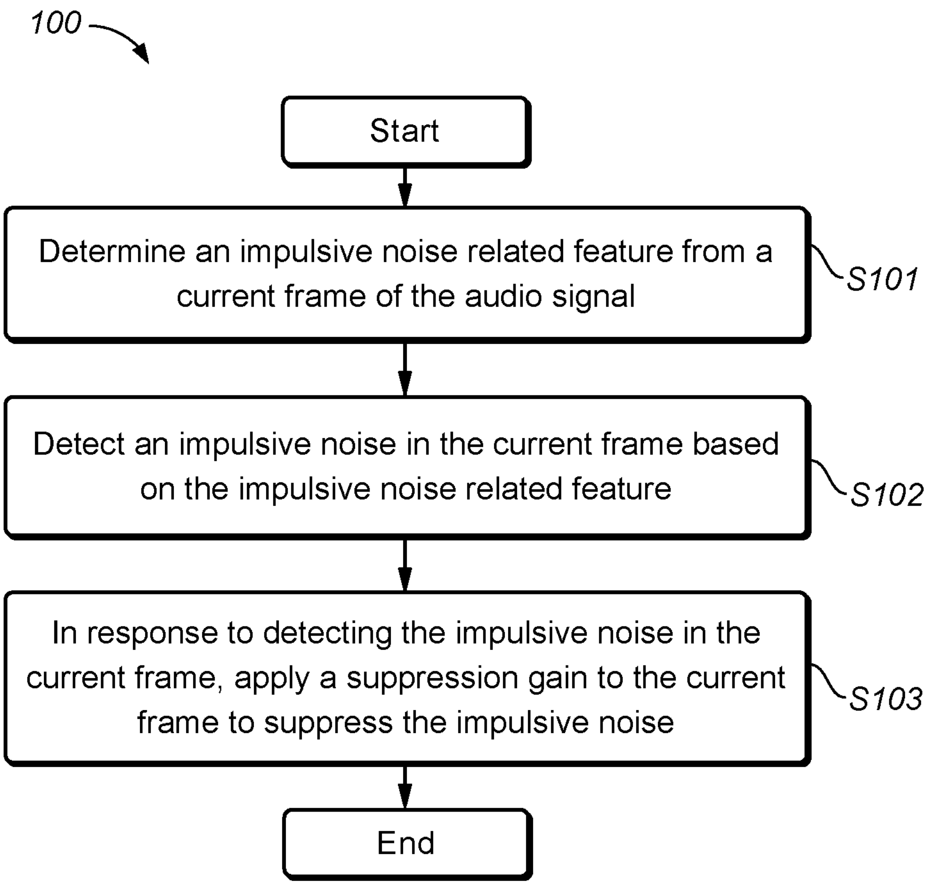
FIG. 1 illustrates a flowchart of a method of impulsive noise suppression in an audio signal in accordance with an example embodiment disclosed herein.

Principles of example embodiments disclosed herein will now be described with reference to various example embodiments illustrated in the drawings. It should be appreciated that depiction of these embodiments is only to enable those skilled in the art to better understand and further implement example embodiments disclosed herein, not intended for limiting the scope disclosed herein in any manner.

Example embodiments disclosed herein may be configured to characterize an impulsive noise so as to detect its presence in an audio signal and then to perform noise suppression on the audio frame where the impulsive noise is detected. According to embodiments disclosed herein, since an impulsive noise generally bears some distinctive features compared to a speech signal or other normal signals, by extracting these features from an input audio signal and utilizing the features to detect the impulsive noise, noise suppression may be specifically performed on respective audio frames where impulsive noises are present. The proposed solution thereby increases an efficiency of impulsive noise removal and maintains minimal impacts on speech quality. Additionally, the proposed solution involves only low latency signal processing using information only from the current and probably proceeding audio frames without looking ahead.

Reference is first made to FIG. 1, which shows a flowchart of a method 100 of impulsive noise suppression in an audio signal in accordance with an example embodiment disclosed herein.

At step S101, an impulsive noise related feature is determined from a current frame of the audio signal.

Figure 2:
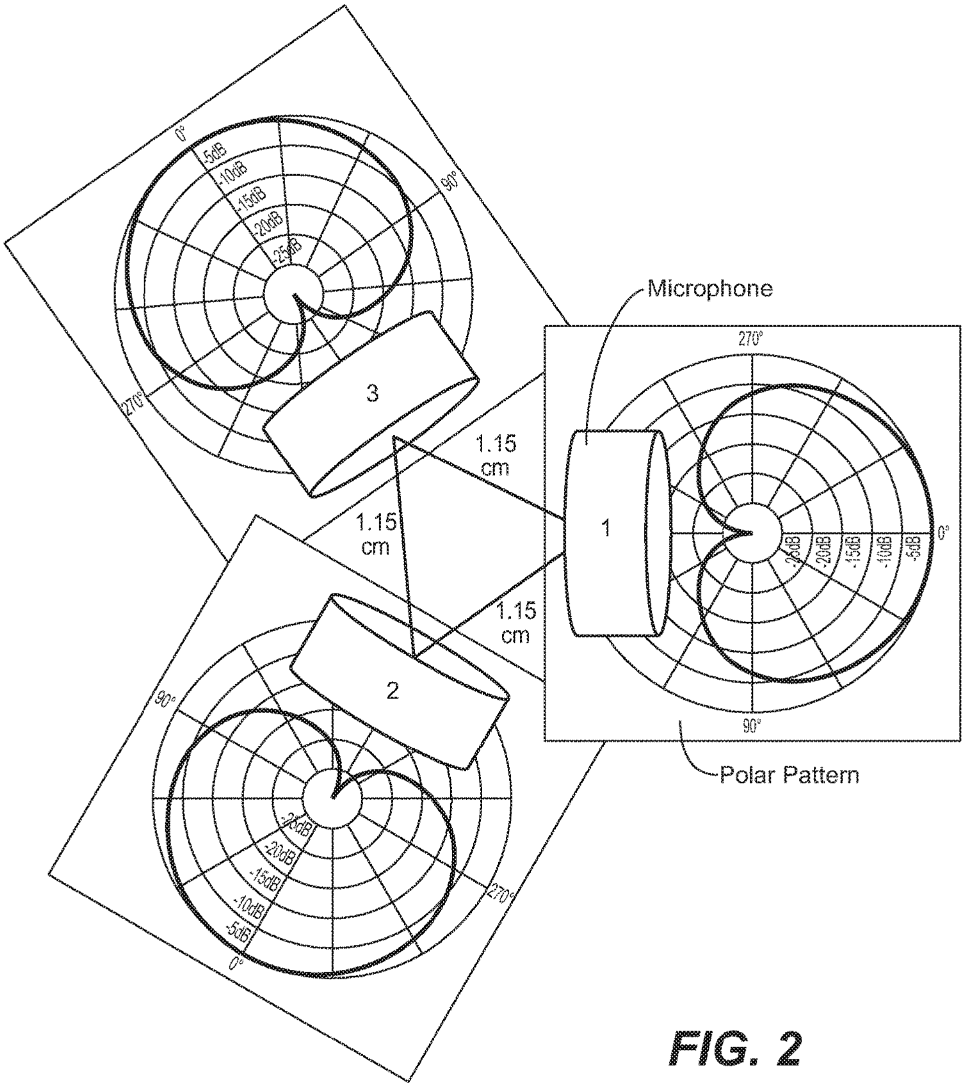
FIG. 2 illustrates an example three-channel directional microphone topology and polar patterns of microphones in the topology in accordance with an example embodiment disclosed herein.

According to embodiments disclosed herein, the audio signal may be captured by a device with one microphone or a microphone array with multiple microphones. Depending on the equipped microphone or microphone array, the audio signal may be a mono signal or a multi-channel signal. It will be appreciated that when a single channel at a microphone array is effective, the captured audio signal may also be monaural. FIG. 2 depicts an example three-channel directional microphone topology and polar patterns of respective microphones in the topology. A device equipped with this microphone topology may capture signals from the three input channels and combine those signals to obtain a captured audio signal. It should be noted that FIG. 2 is given for exemplary illustration and the audio signal to be processed may be captured by devices with other microphone topologies (e.g., an omni-directional microphone array, or a microphone array with more or less than three microphones).

The audio capture device may be any type of communication device or audio recording device with one or more microphones, including but not limited to, a conference telephony device, mobile handset, multimedia device, desktop computer, laptop computer, personal digital assistant (PDA), or any combination thereof.

The audio capture device usually operates in a noisy environment and captures noise signals overlapped with desired audio data that includes speech or other sounds. As discussed above, it is possible to characterize an impulsive noise from an audio signal since the impulsive noise bears some distinctive features. For example, an impulsive noise usually is a shot-term burst of noise that is higher than the normal speech in term of power and has more high frequency components. To this end, a spectral tilt between a high frequency range and a low frequency range or power difference (also referred to as a delta power) between powers of the current frame and a previous frame of the audio signal may be used to indicate whether an impulsive noise is present in the current frame.

Moreover, the captured impulsive noise involves mechanical noise (for example handling noise, button noise, noise coupled from the table) at most time and has a characteristic at the microphone array that is different from a normal speech signal and other acoustic noise. Generally a sound source of the mechanical impulsive noise is proximate to (for example, less than 50 cm from) the capture device. For example, a clicking sound is caused by pressing a mechanical button (e.g., a mute button, a number key button, a speaker button, or the like) on a device, and the button is usually positioned fairly close to the microphone array. For the mechanical impulsive noise, there may be a mechanical coupling to the microphone array rather than a feasibly acoustically borne excitation of the microphones. In this sense, a spatial proximity from a sound source of the captured audio signal (for example, a mechanical button) to the capture device (more specifically, to the microphone array) may suggest whether an impulsive noise is presented. In some embodiments, a high correlation in phrase and/or strength between signals captured by the respective multiple microphones may indicate close proximity. The reason is that the impulsive noise is often correlated at the microphone array since the microphones receive this kind of noise in a similar fashion without the normal distance or phase effects of acoustic propagation across the microphone array.

For each frame of the audio signal, one or more impulsive noise related features can be determined to detect whether an impulsive noise is present in this frame. By way of example, if the spectral tilt and/or delta power indicates that the current frame of the audio signal contain a large amount of high frequency components and the correlation feature indicates that the sound source of the current frame is close to the capture device, it is determined that an impulsive noise may be present in the frame.

It is noted that in the case where the audio signal to be processed is monaural, the features including the spectral tilt and delta power can be used in the noise detection and suppression decision, while in the case where the audio signal contains two or more mono signals, all the above mentioned features can be used.

The determination of impulsive noise related features will be described in details below.

The method 100 proceeds to step S102 to detect an impulsive noise in the current frame based on the impulsive noise related feature.

In embodiments disclosed herein, the extracted impulsive noise related feature(s) may indicate the presence of the impulsive noise in the audio signal. In some embodiments, more than one extracted feature may be combined in a linear/nonlinear way to output an impulsive noise score indicating a probability of presence of an impulsive noise. The output score may be compared with a predetermined threshold to decide whether an impulsive noise is detected in the current frame. In some embodiments, the output score may be binary. That is, the output score may have a value of 0 or 1. The value of 0 may be used to indicate that there is no impulsive noise, and the value of 1 may be used to indicate that an impulsive noise is detected. Alternatively, the impulsive noise score may be determined as a continuous value between 0 and 1, or any other continuous value. The larger the impulsive noise score, the higher the possibility of the presence of the impulsive noise is.

At step S103, in response to detecting the impulsive noise in the current frame, apply a suppression gain to the current frame to suppress the impulsive noise.

The suppression gain may be larger than or equal to zero and smaller than one. In some embodiments, the suppression gain is predetermined as a fixed value, for example, 0.5, 0.7, or the like. When an impulsive noise is detected in the current frame, the fixed suppression gain may be directly used to suppress the impulsive noise. In one embodiment, if it is believed that an impulsive noise exists, the suppression gain may be set to be zero to block the noise in the current frame. Alternatively, the suppression gain may be determined based on the impulsive noise score. In some embodiments, the suppression gain may be inversely proportional to the score. The larger the impulsive noise score, the smaller the suppression gain is, such that more aggressive noise suppression may be applied onto the current frame.

In some embodiments disclosed herein, in order to further improve the suppression performance, a noise power model may be used as prior knowledge to characterize the power of the detected impulsive noise. The noise power model may indicate the noise power of the impulsive noise acquired by the device that captures the audio signal. The noise power model may be constructed based on the mechanical structure of the device and/or the environment where the device located. By analyzing the previous impulsive noises captured by the device, a noise power model may be defined. The suppression gain may be determined based on the noise power indicated by the noise power model and the power of the audio signal. If the noise power is approximated to the power of the audio signal, a small suppression gain may be applied, such that more aggressive noise suppression may be applied onto the current frame. The suppression gain determined based on the noise power model will be described in more details below.

In some embodiments disclosed herein, the suppression gain may be a broadband gain applied to the broadband audio signal. In some other embodiments disclosed herein, a predetermined suppression scheme may be defined to apply different subband gains to respective frequency bands of the audio signal, which will be described in more details below.

Figure 3:
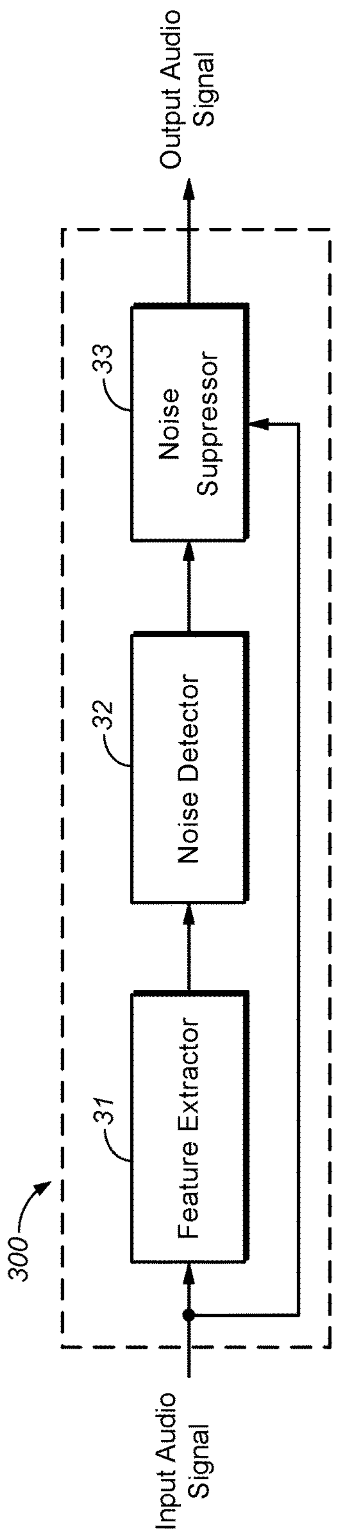
FIG. 3 illustrates a block diagram of a system of impulsive noise suppression in accordance with an example embodiment disclosed herein.

FIG. 3 illustrates a block diagram of an example system of impulsive noise suppression 300 in accordance with an example embodiment disclosed herein. The system 300 may be included in a capture device used to perform impulsive noise suppression for an audio signal captured by this device. The system 300 may also be external to the capture device and has a wired or wireless connection with the device. In this case, the system 300 may receive an audio signal from the capture device and perform impulsive noise suppression on the signal. As depicted in FIG. 3, the system 300 includes a feature extractor 31, a noise detector 32, and a noise suppressor 33.

The feature extractor 31 is configured to extract an impulsive noise related feature from the current frame of input audio signal. An impulsive noise related feature may include a spectral tilt between a high frequency range and a low frequency range and/or power difference between powers of the current frame and a previous frame of the audio signal. Additionally or alternatively, the impulsive noise related feature may include a spatial proximity between the sound source of the audio signal and the capture device and/or the correlation between signals captured by respective microphones of the device. The extracted feature is passed into the noise detector 32.

The noise detector 32 is configured to detect whether an impulsive noise is present in the current frame of the audio signal by analyzing the extracted feature. The detection result is then provided to the noise suppressor 33. The noise suppressor 33 is configured to decide whether to apply a suppression gain to the current frame based on the detection result. If the detection result indicates the presence of the impulsive noise, the noise suppressor 33 may perform noise suppression on the current frame. If the detection result indicates the absence of the impulsive noise, the noise suppressor 33 will take no actions to the audio signal.

It is appreciated that the system 300 of FIG. 3 is shown as an example, and there can be additional or less functional blocks/sub-blocks in the system.

The determination of some example impulsive noise related features is now described in details.

In some embodiments disclosed herein, a spatial proximity from a sound source of an audio signal to a device that captures the audio signal may be determined as an impulsive noise related feature and used to indicate whether there is an impulsive noise.

In one embodiment disclosed herein, a correlation in phrase and/or strength between mono signals respectively captured by at least two microphones of a capture device may be used to measure a spatial proximity between the audio signal and the device. Since the sound source of the impulsive noise, such as a mechanical button, is more close to the device compared with that of the device voice or background noise, the generated impulsive noise is correlated at the microphone array of the device. The reason is that the microphones receive this impulsive noise in a similar fashion without the normal distance or phase effects of acoustic propagation across the microphone array.

In order to determine the correlation, in one embodiment, a covariance matrix for the current frame of the audio signal may be determined first. In this case, input audio signal to be processed may be captured by a device equipped with at least two microphones so that the covariance matrix can represent correlation between mono signals respectively captured by the microphones. In an embodiment disclosed herein, the covariance matrix may be calculated frame by frame as below:

$$C(i,k)=X(i,k)X^H(i,k) \quad (1)$$

where C(i,k) represents the covariance matrix, X(i,k) represents the input audio signal in frequency domain, i represents the frequency band index, k represents the frame index, and the supersubscript H represents Hermitian conjugation permutation. The input audio signal X(i,k) contains signals captured by the equipped microphones. For example, for a device equipped with a microphone topology as illustrated in FIG. 2, the input audio signal X(i,k) may be represented as [L(i,k),R(i,k),S(i,k)], where L(i,k), R(i,k), and S(i,k) represents the frequency domain versions of signals captured by the three microphones, respectively.

According to Equation (1), covariance matrices for different frequency bands may be determined for the current frame. Alternatively or additionally, a covariance matrix for the broad band of the current frame may be determined as well. In some other embodiments disclosed herein, a covariance matrix in time domain may also be determined by averaging the covariance matrices of respective multiple samples of the current frame.

In some embodiments disclosed herein, the covariance matrix may be smoothed by a smoothing factor. For example, the covariance matrix of the current frame may be smoothed as below:

$$C(\omega,k)=\alpha C(\omega,k-1)+(1-\alpha)X(\omega,k)X^H(\omega,k) \quad (2)$$

where C(ω,k−1) represents the covariance matrix of a previous frame k−1, and α is a smoothing factor within a range of 0 to 1. It will be appreciated that the broadband covariance matrix and the covariance matrix in time domain may be similarly smoothed.

As mentioned above, the obtained covariance matrix may represent a correlation between the mono signals respectively captured by the microphones. If the covariance matrix is a diagonal matrix, it means that those mono signals are not correlated. Otherwise, nonzero values in positions other than the trace of the covariance matrix may represent a correlation degree between those signals. If an impulsive noise, such as an impulsive clicking noise occurs when microphones of an audio capture device are capturing signals, since the source of the impulsive noise is more proximate to the capture device than normal audio sources, the impulsive noise may be captured by each of the microphones. As a result, the correlation between the mono signals is relatively high since those signals all contain the impulsive noise. In this case, a covariance matrix of the current frame, which indicates the correlation between the phrases or strengths of the mono signals, may be used as a spatial proximity feature to indicate whether an impulsive noise is present. The correlation calculated for the current frame k may be represented as a proximity score P(k).

As discussed above, the sound source of the impulsive noise, for example a button by pressing which a clicking noise is made, is fairly close to the capture device, resulting in that the same noise signal is captured by all of the microphones simultaneously. In this case, the captured signal may have substantially equal signal strengths in all directions. In order to obtain the spatial proximity, in some other embodiments disclosed herein, strengths of the audio signal in two or more directions may be determined. If the strengths are subsequently equal to one another, it means that the sound source of the audio signal is approximated to the capture device and thus it is possible to detect an impulsive noise in the audio signal.

Reference to direction herein is made in relation to spatial determination related to a particular sound source or sound activity detected by the microphones. It should be noted that direction in this sense is not limited to the literal sense of a particular angle of incidence or distance to the microphone in only an acoustic sense. Rather, when the concept of direction is referred to around the microphone array, it refers to the clustering or segmentation of the signal correlation properties of the microphones for sources related to a particular form of device excitation, both acoustical and mechanical. It is known that different source positions or mechanical orientations, together with the geometric and coupling configurations of the microphones, create a specific spatial detection geometry that has well-formed representations in the correlation or covariance space of the microphone inputs. For simplicity, these sources of input are generally referred to as sources having different directions or distances.

In some embodiments disclosed herein, in order to determine and compare the signal strengths of the audio signal in different directions, a covariance matrix may be first determined for the current frame of the audio signal. In these embodiments, a covariance matrix may be calculated for the broadband audio signal, or multiple covariance matrices may be calculated for respective frequency bands of the audio signal. Eigen-decomposition may be performed on the covariance matrix to obtain the eigenvectors and eigenvalues. For example, the eigen-decomposition of a broadband covariance matrix C(k) of the current frame k may be defined as:

$$[V,D]=\text{eigen}(C(k)) \quad (3)$$

where V represents a matrix with each column indicating an eigenvector of the covariance matrix C(k), and D represents a diagonal matrix with corresponding eigenvalues sorted in a descending order. In one example, when the audio signal is a three-channel signal, the matrices V and D are both 3-by-3 matrices. That is, the number of eigenvalues or eigenvectors is the same as the number of the input channels.

The eigenvalues presented in the diagonal matrix D indicates the highest signal strengths in the audio signal in the directions indicated by the matrix V. When the eigenvalues are approximated with one another, it means that signal strengths from all directions are substantially equal, which possibly indicates that the audio signal contains a closed impulsive noise. As such, based on the obtained eigenvalues, a proximity score, which indicates the spatial proximity, may be determined for the current frame of the audio signal. In an embodiment, the proximity score may be determined as a ratio of the largest eigenvalue over the second largest eigenvalue, which may be represented as below:

$$P(k)=\frac{D(1,1)}{D(2,2)} \quad (4)$$

where P(k) represent the proximity score for the current frame k, D(1,1) represents the largest eigenvalue, and D(2,2) represents the second largest eigenvalue. Both D(1,1) and D(2,2) are positioned in the trace of the diagonal matrix D. A high proximity score may indicate close proximity to the capture device and high correlation of the audio signal. In this embodiment, the more the proximity score closed to one, the higher the possibility of presence of an impulsive noise is.

It is noted that in the above embodiments, the audio signal may be captured by a device with at least two microphones so as to determine a proximity score that is indicative of the spatial proximity between the source sound of the audio signal and the device. It is also noted that the proximity score may be determined in many other ways. For example, the proximity score may be defined as a ratio between the second largest eigenvalue over the third largest eigenvalue, or between any two eigenvalues in the trace of the diagonal matrix D obtained by eigen-decomposition.

In some embodiments disclosed herein, the eigen-decomposition may be performed on respective covariance matrices C(i,k) for different frequency bands of the current frame. In these embodiments, proximity scores for respective frequency bands may be calculated accordingly so as to indicate whether an impulsive noise is present in the respective frequency bands. As such, the subsequent noise suppression may then be precisely carried out on specific frequency bands.

In some embodiments disclosed herein, the impulsive noise related feature may include a spectral tilt of the audio signal. The spectral tilt may be determined by comparing powers in a high frequency range and a low frequency range of the current frame of the audio signal.

In these embodiments, the broadband frequency of the current frame may be divided into two parts, a high frequency range and a low frequency range. For example, for a frame of audio signal with a frequency range of 1000 Hz to 16 kHz, the low frequency range may span from 1000 Hz to 4000 Hz, and the high frequency range may span from 4000 Hz up to 16 kHz. The high frequency range and the low frequency range may be further divided into multiple frequency bands, respectively. The powers in respective frequency bands located in the high frequency range may be summed up, and the powers in respective frequency bands located in the low frequency range may be also summed up. In one embodiment, a power in each frequency band may be calculated by the square of the signal strength in the frequency band. In the case where the audio signal is a multi-channel signal, a power in each frequency band may be the sum of squares of respective signal strengths in the multiple channels.

In some embodiments where covariance matrices for respective frequency bands have been calculated, the summed powers in the high frequency range may be the sum of values in the traces of the covariance matrices determined for frequency bands in the high frequency range. The summed powers in the low frequency band may be the sum of values in the traces of the covariance matrices determined for frequency bands in the low frequency range. Suppose that the low frequency range is from 1000 Hz to 4000 Hz with frequency band indexes from 25 to 40, and the high frequency range is from 4000 Hz up to 16 kHz with frequency band indexes from 41 to 56. The summed powers in the low frequency range and the high frequency range may be calculated as:

$$w_{low(k)} = \sum_{i=25}^{40} \mathrm{Tr}(C(i, k)) \tag{5}$$

$$w_{high(k)} = \sum_{i=41}^{56} \mathrm{Tr}(C(i, k)) \tag{6}$$

where Tr represents the trace of a covariance matrix C(i,k), $w_{low(k)}$ represents the summed power in the low frequency range, $w_{high(k)}$ represents the summed power in the high frequency range, i represents the frequency band index, and k represents the frame index.

In an embodiment disclosed herein, the spectral tilt for the current frame may be determined by a ratio of the summed power in the high frequency range over that in the low frequency range, indicating a shape of the current frame of the audio signal in frequency domain. The impulsive noise generally includes more high frequency components compared with a speech signal since the speech signal generally has a low frequency range from 200 Hz to 2000 Hz. To this end, the spectral tilt may be used as an indication of whether an impulsive noise is present in the current frame. If the spectral tilt is determined to be lager, it means that more power is contained in the high frequency range of the current frame. In this case, there is a high probability that an impulsive noise is contained in the current frame.

In order to bound the resulting value to a range of 0 to 1 so as to avoid the impact of outlier power values and facilitate subsequent mathematic calculation, the spectral tilt may be determined as:

$$T(k) = \max\left(\min\left(\left|\frac{w_{high(k)}}{w_{low(k)}}\right| - 1, 1\right), 0\right) \tag{7}$$

where T(k) represents the spectral tilt.

It should be noted that the spectral tilt may be determined by comparing the powers in the high and low frequency ranges in many other ways. In an embodiment, the spectral tilt may be determined by the power difference between the two powers. When the power difference is larger than a threshold, it is indicated that an impulsive noise is probably present in the audio signal. Alternatively, the spectral tilt may also be a ratio of the power in the low frequency range over that in the high frequency range. In this embodiment, the lower the spectral tilt, the higher the possibility of presence of an impulsive noise is.

The spectral tilt discussed above may indicate the shape of the current frame of the audio signal in frequency domain. In some other embodiments, another impulsive noise related feature, a delta power of the audio signal may be determined by comparing powers in a high frequency range of the current frame and a previous frame of the audio signal. The delta power may represent a shape of the current frame in time domain, for example, the change of the power from the previous frame. Since the impulsive noise is generally a shot-time burst in the audio signal, a sudden jump of power across frames may be expected. As such, the delta power may be used to characterize an impulsive noise, indicating whether the impulsive noise is present in the current frame. The delta power may be determined by the difference between powers in the high frequency range of the current frame and the previous frame in an embodiment disclosed herein. In another embodiment, the delta power may also be calculated as below:

$$D(k) = \left|\frac{w_{high(k)} - w_{high(k-1)}}{w_{high(k)}}\right| \tag{8}$$

where D(k) represents the delta power.

It will be appreciated herein that a previous frame may not necessarily be the frame directly followed by the current frame, but may be any previous frame with a short-time interval from the current frame. Only powers in a high frequency range are considered in these embodiments because low frequency components of the audio signal may contain more speech components, which would potentially lower the differentiability of this feature from the speech.

The determination of some example impulsive noise related features, such as a covariance matrix, spectral tilt, delta power, and spatial proximity, are described above. It is appreciated that there are many other impulsive noise related features that can be used to characterize an impulsive noise, and the scope of the subject matter disclosed herein is not limited in this regard.

The extracted features may facilitate detection of an impulsive noise from an audio signal. In embodiments disclosed herein, one or more of the extracted features may be analyzed to determine the presence of the impulsive noise. For example, one of the covariance matrix, the spectral tilt, the delta power, and the spatial proximity (for example, the proximity score) may be used independently to make a decision about the presence of the impulsive noise. For example, as discussed above, the higher the correlation indicating by the covariance matrix, the higher the possibility of the presence of the impulsive noise is.

In embodiments where some or all of the extracted features are employed, the features may be combined in a linear or nonlinear way to obtain an impulsive noise score indicating a possibility of presence of an impulsive noise. For example, an impulsive noise score may be defined as the product of the proximity score P(k), the spectral tilt T(k), and the delta power D(k). By comparing the impulsive noise score with a predetermined threshold, a decision may be made to decide whether an impulsive noise is present. This detection scheme may be represented as below:

$$M(k)=\begin{cases}1, & \text{if } P(k)T(k)D(k)>\text{M\_THR}\\ 0, & \text{otherwise}\end{cases} \tag{9}$$

where M_THR represents a predetermined threshold. M(k)=1 represents the presence of the impulsive noise in the current frame k, and M(k)=0 represents the absence of the impulsive noise. If the proximity score P(k), the spectral tilt T(k), and the delta power D(k) are determined in a range from 0 to 1, for example, calculated by Equations (4), (7), and (8) respectively, the threshold M_THR may be set as a value within the range from 0 to 1. For example, the threshold M_THR may be predetermined as 0.4, 0.5, 0.6, or the like. It should be noted that the threshold may be set as other values depending on the value range of the extracted features, and the scope of the subject matter disclosed herein is not limited in this regard.

In some embodiments disclosed herein, a weighted sum of the proximity score P(k), the spectral tilt T(k), and the delta power D(k) may be determined as an impulsive noise score to be compared with a predetermined threshold. In some other embodiments, the extracted features may be combined in many other ways to indicate an impulsive noise score.

In some further embodiments disclosed herein, as some extracted features, such as the covariance matrix and the proximity score, may be frequency band-specific features, the detection result may be more precise to indicate whether an impulsive noise signal is present in each frequency band. For example, based on one proximity score determined for each frequency band independently or in conjunction with other extracted features, an impulsive noise score may be derived for the frequency band. If the impulsive noise score is higher than a threshold (which may also be frequency band-specific), an impulsive noise is detected to be present in this frequency band.

In response to detecting an impulsive noise in the current frame based on the extracted feature(s), a suppression gain can be applied to the frame to suppress the impulsive noise, as discussed above. The suppression gain may be a predetermined broadband gain in an embodiment. More precise subband gains may also be predetermined for different frequency bands to suppress the impulsive noise in another embodiment. In this case, when an impulsive noise is detected in the current frame, all subband gains may be applied to respective frequency bands. Alternatively, only when an impulsive noise signal is detected in a frequency band of the current frame, the corresponding subband gain is applied to this band, which may further improve the suppression performance and reduce the distortion of the audio signal.

In some embodiments, in order to further minimize the speech distortion, a noise power model may be constructed for an impulsive noise captured by the capture device. Since the capture device is generally located in the same environment, and in many cases an impulsive noise comes from clicking of a mechanical button on the device, an impulsive noise signal captured by the device may be a relatively consistent and distinctive type of signal. As a result, it is possible to measure and model the power of the possible impulsive noise that may be captured. The noise power model may indicate a noise power of an impulsive noise acquired by the device that captures the audio signal. The noise power model may be constructed based on the mechanical structure of the device (such as the distribution of the mechanical buttons on the device, or the like) and/or the environment where the device located. The noise power model may also be based on the powers of the previous impulsive noises captured by the device. By analyzing the previous impulsive noises captured by the device, a noise power model may be defined.

Figure 4:
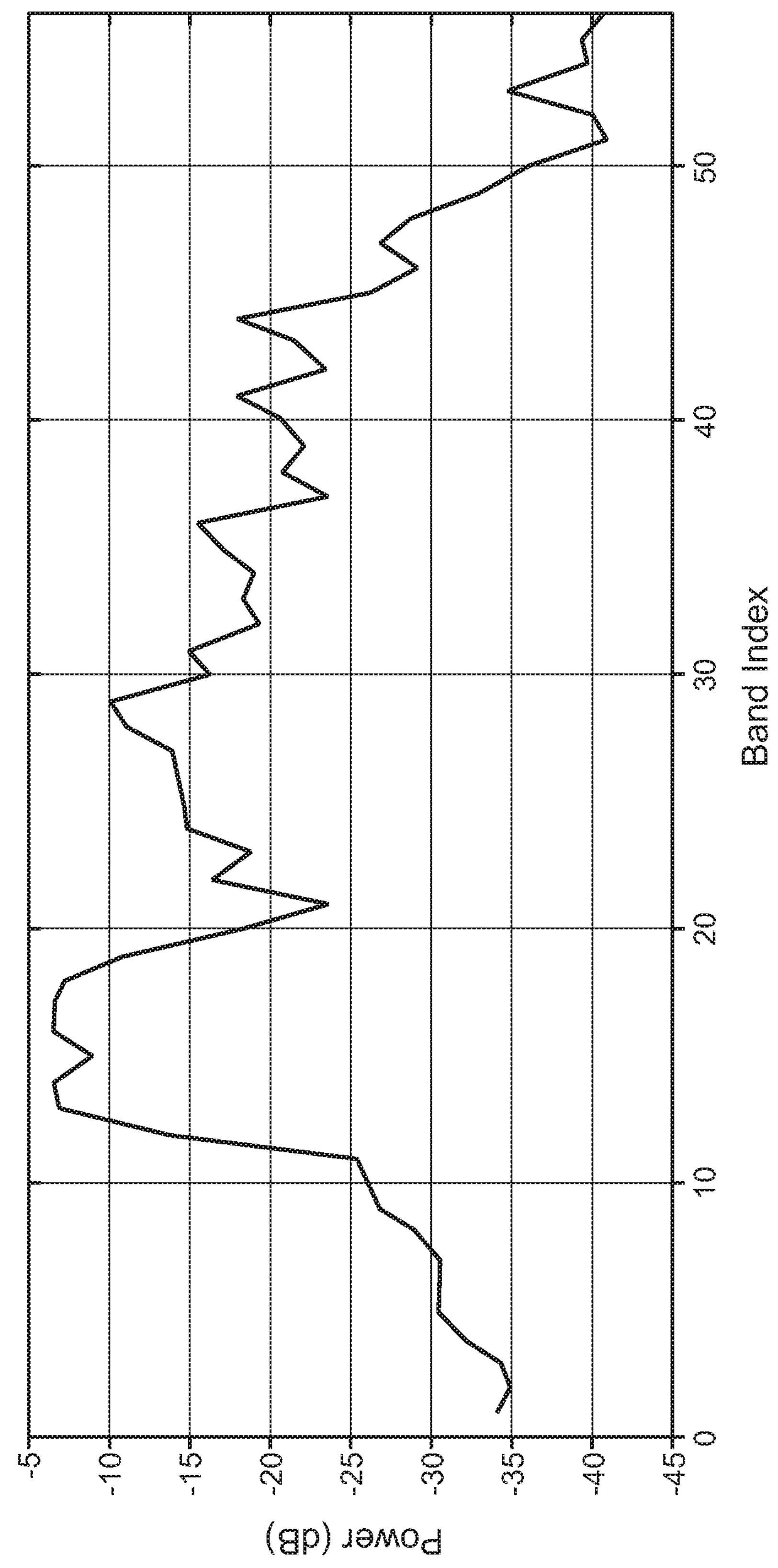
FIG. 4 illustrates a schematic diagram of a power spectrum model for an impulsive noise in accordance with an example embodiment disclosed herein.

The noise power model may be predetermined as an averaged power value of one or more previous impulsive noises captured by the device. Alternatively or additionally, the noise power model may be predetermined as a power spectrum model with respective powers in all frequency bands of the previous impulsive noise(s). For purpose of illustration, FIG. 4 depicts a schematic diagram of an example power spectrum model for an impulsive noise.

When an audio signal is input and an impulsive noise is detected in the current frame of the audio signal, a suppression gain may be determined based on the noise power model and a power of the current frame of the audio signal. The noise power model, for example, a predetermined power value, may be used to indicate a noise power of the detected impulsive noise. Since the suppression gain is applied to the audio signal to suppress the impulsive noise therein, it may be negatively correlated to the noise power. The more the noise power proximate to the power of the current frame, the lower the suppression gain is, such that more aggressive noise suppression may be applied onto the current frame. For example, the power difference between the predetermined noise power value and the power of the current frame of the audio signal may be first determined and then the suppression gain may be calculated as a ratio of the power difference over the power of the current frame. It should be noted that there are many other ways to determine the suppression gain based on the predetermined noise power and the power of the audio signal, and the scope of the subject matter disclosed herein is not limited in this regard.

In embodiments where a power spectrum model is predetermined, a power value in each frequency band may be derived from the power spectrum model and used to indicate a noise power of the detected impulsive noise in the corresponding band. This noise power may also be utilized to determine a suppression gain specific for the band.

In some further embodiments disclosed herein, rather than assuming that the impulsive noise is only present in the current frame and has no impact on subsequent frames, the impulsive noise decays over time in a real environment. In order to better simulate the impact of the impulsive noise, a room decay factor may be introduced to calculate a decayed version of the impulsive noise power. The room decay factor may be configured based on RT 60, which indicates the elapsed time the power of the signal dropping from its initial level to 60 dB. If an impulsive noise is detected in a previous frame and there is no impulsive noise in the current frame according to embodiments disclosed herein, a decayed noise power may be determined based on the room decay factor and the predetermined noise power or power spectrum. A suppression gain may then be calculated based on the decayed noise power and a power of the current frame of the audio signal.

Since the suppression gain is applied to the audio signal to suppress the impulsive noise therein, it may be negatively correlated to the decayed noise power. The more the decayed noise power proximate to the power of the current frame, the lower the suppression gain is, such that more aggressive noise suppression may be applied onto the current frame. For example, the power difference between the decayed noise power and the power of the current frame of the audio signal may be first calculated and then suppression gain may be calculated as a ratio of the power difference over the power of the current frame. It should be noted that there are many other ways to determine the suppression gain based on the decayed noise power and the power of the audio signal, and the scope of the subject matter disclosed herein is not limited in this regard. The suppression gain may be applied to the current frame of the audio signal to suppress a decayed version of the impulsive noise that is detected in the previous frame.

It can be seen that although no impulsive noise is detected to be present in the current frame, noise suppression may also be performed on the current frame when an impulsive noise is detected in a previous frame. By doing this, reflections and/or reverberant parts of the impulsive noise occurring previously in a practical room may also be suppressed.

According to the above description related to the predetermined noise power, for a current frame, its estimated noise power may be determined as below:

$$MN(k)=\max(NS*M(k),\beta*MN(k-1)) \tag{10}$$

where MN(k) represents the estimated noise power for the current frame k, NS represents the predetermined noise power for the impulsive noise acquired by the device that captures the audio signal, M(k) represents the detection result as indicated in Equation (9), and β represents the room decay factor.

As can be seen from Equation (10), if an impulsive noise is detected in the current frame k (for example, M(k)=1), the estimated noise power for the frame MN(k) is equal to the predetermined noise power NS. If an impulsive noise is not detected in the current frame k (for example, M(k)=0), the estimated noise power for the frame MN(k) is a decayed version of the noise power of the previous frame β*MN(k−1).

The suppression gain may be calculated based on the estimated noise power (which may be the predetermined noise power or a decayed noise power) and the power of the audio signal. The more the estimated noise power proximate to the power of the current frame, the lower the suppression gain is, such that more aggressive noise suppression may be applied onto the current frame. For example, the power difference between the estimated noise power and the power of the current frame of the audio signal may be first determined and then suppression gain may be calculated as a ratio of the power difference over the power of the current frame, which may be represented as below:

$$G(k)=\frac{InP(k)-MN(k)}{InP(k)} \tag{11}$$

where InP(k) represents the power of the current frame k, MN(k) represents the estimated noise power, and G(k) represents the suppression gain.

It should be noted that there are many other ways to determine the suppression gain based on the estimated noise power and the power of the audio signal, and the scope of the subject matter disclosed herein is not limited in this regard.

Figure 5:
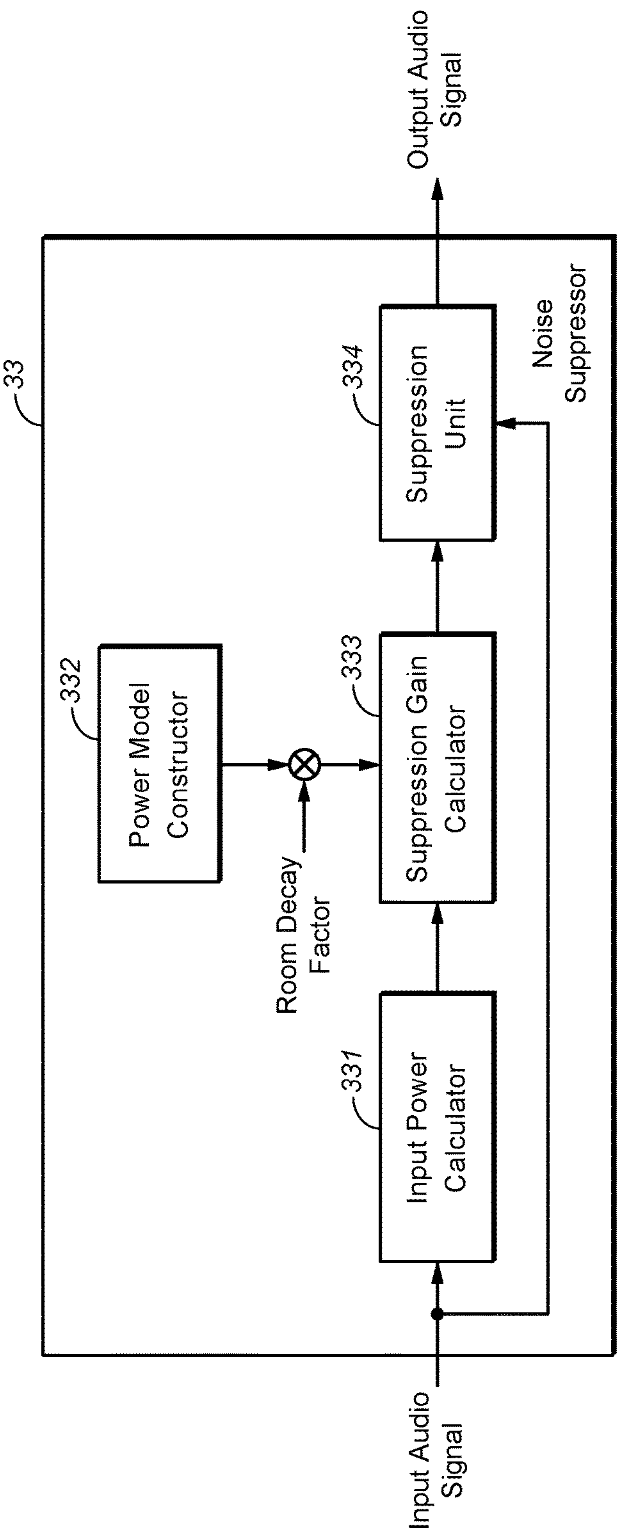
FIG. 5 illustrates a block diagram of a noise suppressor in the system of FIG. 3 in accordance with an example embodiment disclosed herein.

FIG. 5 depicts a block diagram of an example noise suppressor 33 in the system 300 in accordance with an example embodiment disclosed herein. The noise power model is introduced in the noise suppressor 33. As depicted, the noise suppressor 33 includes an input power calculator 331, a power model constructor 332, a suppression gain calculator 333, and a suppression unit 334.

The input power calculator 331 is configured to determine an input power of the current frame of input audio signal. The input power is passed into the suppression gain calculator 333.

The power model constructor 332 is configured to model an impulsive noise that is captured by the capture device and construct a noise power model for the impulsive noise, which noise power model may indicate a power of the impulsive noise previously acquired by the capture device. The noise power model may be constructed based on distribution of the mechanical buttons on the device and/or the real environment where the device is located.

The suppression gain calculator 333 is configured to calculate a suppression gain for noise suppression based on the input power from the input power calculator 331 and the noise power. A room decay factor is used to decay the noise power if no impulsive noise is detected in the current frame of the audio signal. The calculated suppression gain is provided to the suppression unit 334. In some embodiments, different suppression gains may be calculated for respective frequency bands of the audio signal.

The suppression unit 334 is configured to apply the suppression gain to the current frame of the audio signal to suppress the impulsive noise. In some embodiments, frequency band-specific gains may be applied to corresponding frequency bands of the current frame to achieve precise noise suppression.

It is appreciated that more than one predetermined noise power may be constructed as prior knowledge of the possible impulsive noise signals captured by the device. One of the constructed models may be selected to determine the suppression gain based on the impulsive noise related features extracted from the audio signal.

In some further embodiments disclosed herein, in order to decrease the possible discomfort caused by the noise suppression and reduce computation costs, a predefined criteria may be applied to determine whether noise suppression should be performed on the current frame of the audio signal. The basic principle of the criteria is to disable the noise suppression when there is no possibility that an impulsive noise is generated and to enable the noise suppression when an impulsive noise is possible to be generated in practical case scenarios.

For example, if there is no speech signal in a microphone input of a capture device but speech signals from the farend device, it probably means that the local talker of the capture device is listening to the farend talker. In this case, the noise suppression process may be enabled because there is a possibility that the local talker wants to mute the capture device due to background noises or the intention of local discussion, which may result in a clicking noise caused by pressing a mute button. On the other hand, if there is only local speech activity, the noise suppression process may be disabled since the local talker is not likely to mute the microphone during the talk spurt.

Accordingly, the predefined criteria may be based on a conversational heuristic. The conversational heuristic is used to detect whether a speech signal is captured by the device. When it is detected by the conversational heuristic that a speech signal is input to the capture device, the predefined criteria is not satisfied and the noise suppression process may be disabled. That is to say, the system 300 may stop operations for noise suppression. When it is detected that a speech signal is transmitted from the farend device and is playing in the local device, the predefined criteria is satisfied and noise suppression may still be performed on input frames of the audio signal captured by the local device.

It is appreciated that there can be many other criteria can be applied to intelligibly decide whether to suppress the impulsive noise or not in a frame of the captured audio signal based on current conversational states. For example, when it is detected that the local and farend talkers are involved in a question answering conversation, the noise suppression may be stopped or a relatively high suppression gain may be applied to avoid the speech quality impacts introduced by the noise suppression operations.

It is appreciated that besides the conversational heuristic technique, many other suitable detection methods, either currently known or to be developed in the future, may be used to intelligibly detect conversational states.

According to embodiments disclosed herein, impulsive noise related features are immediately extracted based on the current frame and noise suppression is applied in response to an impulsive noise is detected in this frame based on the features. Even in embodiments where a noise power model is employed, the model is constructed based on the signals (for example, impulsive noise signals) captured previously. Therefore, the proposed solution herein requires less latency and is suitable for many real-time scenarios, such as interactive voice or communication use cases. Moreover, a more precise decision of impulsive noise is made based on the extracted features, which achieves a decreased error rate in impulsive noise suppression and a minimal impact on the speech quality.

Figure 6:
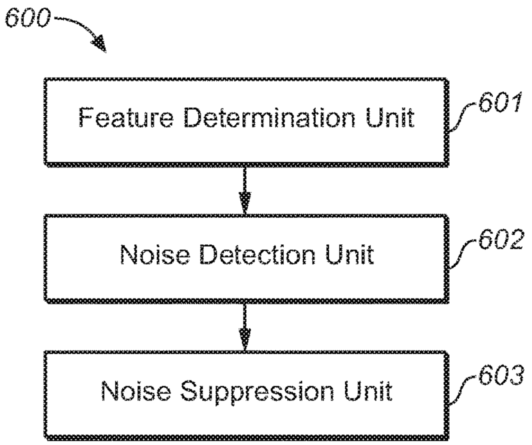
FIG. 6 illustrates a block diagram of a system of impulsive noise suppression in an audio signal in accordance with an example embodiment disclosed herein.

FIG. 6 depicts a block diagram of a system of impulsive noise suppression in an audio signal 600 in accordance with an example embodiment disclosed herein. As depicted, the system 600 includes a feature determination unit 601 configured to determine an impulsive noise related feature from a current frame of the audio signal. The system 600 also includes a noise detection unit 602 configured to detect an impulsive noise in the current frame based on the impulsive noise related feature, and a noise suppression unit 603 configured to apply a suppression gain to the current frame in response to detecting the impulsive noise in the current frame so as to suppress the impulsive noise.

In some embodiments disclosed herein, the feature determination unit 601 may be configured to determine a spectral tilt of the current frame by comparing powers in a high frequency range and a low frequency range of the current frame, the spectral tilt indicating a shape of the current frame in frequency domain.

In some embodiments disclosed herein, the feature determination unit 601 may be configured to determine a delta power of the current frame by comparing powers in a high frequency range of the current frame and a previous frame of the audio signal, the delta power indicating a shape of the current frame in time domain.

In some embodiments disclosed herein, the feature determination unit 601 may be configured to determine a spatial proximity from a sound source of the audio signal to a device that captures the audio signal.

In some embodiments disclosed herein, the device captured the audio signal may have a first microphone and a second microphone, and the feature determination unit 601 may be configured to determine the spatial proximity by determining a correlation between a first mono signal acquired by the at least two first microphone and a second mono signal acquired by the second microphone.

In some embodiments disclosed herein, the feature determination unit 601 may be further configured to determine a first strength of the audio signal in a first direction, determine a second strength of the audio signal in a second direction, and determine the spatial proximity by comparing the first and second strengths.

In some embodiments disclosed herein, the noise suppression unit 603 may be configured to determine the suppression gain based on a predetermined noise power of a previous impulsive noise and a power of the current frame in response to detecting the impulsive noise in the current frame, and apply the determined suppression gain to the current frame of the audio signal to suppress the impulsive noise.

In some embodiments disclosed herein, the system 600 may further include a decayed power determination unit configured to determine a decayed noise power based on a room decay factor and a predetermined noise power of a previous impulsive noise in response to detecting no impulsive noise in the current frame and detecting an impulsive noise in a previous frame, a suppression gain determination unit configured to determine another suppression gain based on the decayed noise power and a power of the current frame, and a decayed noise suppression unit configured to apply the other suppression gain to the current frame to suppress a decayed version of the impulsive noise.

In some embodiments disclosed herein, the system 600 may further include a noise suppression decision unit configured to determine whether to suppress the impulsive noise or not in the current frame by deciding whether a predefined criteria is satisfied.

For the sake of clarity, some optional components of the system 600 are not shown in FIG. 6. However, it should be appreciated that the features as described above with reference to FIGS. 1-5 are all applicable to the system 600. Moreover, the components of the system 600 may be a hardware module or a software unit module. For example, in some embodiments, the system 600 may be implemented partially or completely as software and/or in firmware, for example, implemented as a computer program product embodied in a computer readable medium. Alternatively or additionally, the system 600 may be implemented partially or completely based on hardware, for example, as an integrated circuit (IC), an application-specific integrated circuit (ASIC), a system on chip (SOC), a field programmable gate array (FPGA), and so forth. The scope of the subject matter disclosed herein is not limited in this regard.

Figure 7:
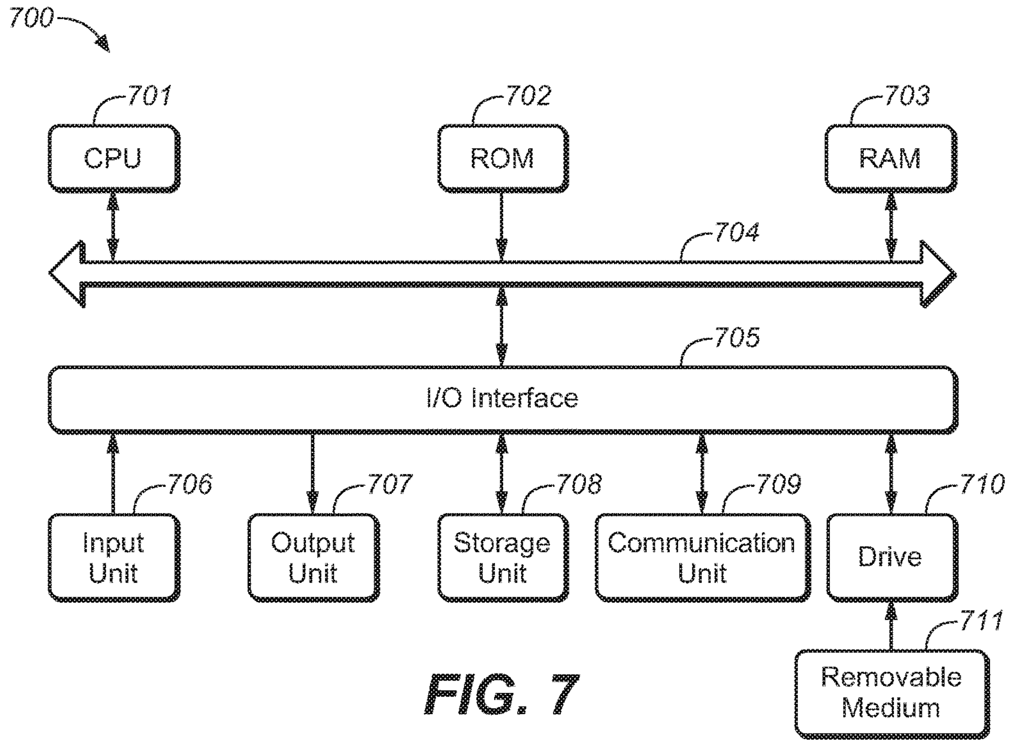
FIG. 7 illustrates a block diagram of an example computer system suitable for implementing example embodiments disclosed herein.

FIG. 7 depicts a block diagram of an example computer system 700 suitable for implementing example embodiments disclosed herein. In some example embodiments, the computer system 700 may be suitable for implementing the method of impulsive noise suppression in an audio signal.

As depicted, the computer system 700 includes a central processing unit (CPU) 701 which is capable of performing various processes in accordance with a program stored in a read only memory (ROM) 702 or a program loaded from a storage unit 708 to a random access memory (RAM) 703. In the RAM 703, data required when the CPU 701 performs the various processes or the like is also stored as required. The CPU 701, the ROM 702 and the RAM 703 are connected to one another via a bus 704. An input/output (I/O) interface 705 is also connected to the bus 704.

The following components are connected to the I/O interface 705: an input unit 706 including a keyboard, a mouse, or the like; an output unit 707 including a display such as a cathode ray tube (CRT), a liquid crystal display (LCD), or the like, and a loudspeaker or the like; the storage unit 708 including a hard disk or the like; and a communication unit 709 including a network interface card such as a LAN card, a modem, or the like. The communication unit 709 performs a communication process via the network such as the internet. A drive 710 is also connected to the I/O interface 705 as required. A removable medium 711, such as a magnetic disk, an optical disk, a magneto-optical disk, a semiconductor memory, or the like, is mounted on the drive 710 as required, so that a computer program read therefrom is installed into the storage unit 708 as required.

Specifically, in accordance with example embodiments disclosed herein, the processes described above with reference to FIG. 1 may be implemented as computer software programs. For example, example embodiments disclosed herein provide a computer program product including a computer program tangibly embodied on a machine readable medium, the computer program including program code for performing the method 100. In such embodiments, the computer program may be downloaded and mounted from the network via the communication unit 709, and/or installed from the removable medium 711.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods disclosed herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. Further, it is well known to the skilled person that communication media typically embodies computer readable instructions, data structures, program modules or other data in a modulated data signal such as a carrier wave or other transport mechanism and includes any information delivery media.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter disclosed herein or of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications, adaptations to the foregoing example embodiments disclosed herein may become apparent to those skilled in the relevant arts in view of the foregoing description, when read in conjunction with the accompanying drawings. Any and all modifications will still fall within the scope of the non-limiting and example embodiments disclosed herein. Furthermore, other embodiments disclosed herein will come to mind to one skilled in the art to which these embodiments pertain having the benefit of the teachings presented in the foregoing descriptions and the drawings.

Accordingly, the present subject matter may be embodied in any of the forms described herein. For example, the following enumerated example embodiments (EEEs) describe some structures, features, and functionalities of some aspects of the subject matter.

EEE 1. A method for detection, classification, and suppression of an impulsive noise on a capture device having one or more microphones, the method comprises extracting signal features of the microphone signal, the features including a ratio of the subband powers, a delta power, and a spatial proximity extracted from the covariance matrix of the microphone signal; detecting whether there is an impulsive noise included in the microphone signal based on a nonlinear mapping of the features; and suppressing the impulsive noise using a broadband gain or a predetermined subband suppression scheme.

EEE 2. The method according to EEE 1, wherein the method further comprises utilizing room decay information to enhance the suppression performance.

EEE 3. The method according to EEE 1, wherein the method further comprises using conversational heuristics to switch on/off the impulsive noise suppression for purpose of more intelligible processing.

It will be appreciated that the embodiments of the subject matter are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A method of impulsive noise suppression in an audio signal, comprising:

determining an impulsive noise related feature from a current frame of the audio signal;

detecting an impulsive noise in the current frame based on the impulsive noise related feature; and in response to detecting the impulsive noise in the current frame, applying a suppression gain to the current frame to suppress the impulsive noise, wherein determining an impulsive noise related feature from a current frame of the audio signal comprises:

determining a spectral tilt of the current frame by comparing powers in a high frequency range and a low frequency range of the current frame, the spectral tilt indicating a shape of the current frame in frequency domain.

2. The method according to claim 1, wherein determining an impulsive noise related feature from a current frame of the audio signal comprises:

determining a delta power of the current frame by comparing powers in a high frequency range of the current frame and a previous frame of the audio signal, the delta power indicating a shape of the current frame in time domain.

3. The method according to claim 1, wherein determining an impulsive noise related feature from a current frame of the audio signal comprises:

determining a spatial proximity from a sound source of the audio signal to a device that captures the audio signal.

4. The method according to claim 3, wherein the device captured the audio signal has a first microphone and a second microphone, and wherein determining the spatial proximity comprises:

determining a correlation between a first mono signal acquired by the first microphone and a second mono signal acquired by the second microphone.

5. The method according to claim 3, wherein determining the spatial proximity comprises:

determining a first strength of the audio signal in a first direction;

determining a second strength of the audio signal in a second direction; and determining the spatial proximity by comparing the first and second strengths.

6. The method according to claim 1, wherein applying a suppression gain to the current frame in response to detecting the impulsive noise in the current frame comprises:

in response to detecting the impulsive noise in the current frame, determining the suppression gain based on a predetermined noise power of a previous impulsive noise and a power of the current frame; and applying the determined suppression gain to the current frame to suppress the impulsive noise.

7. The method according to claim 1, further comprising:

in response to detecting no impulsive noise in the current frame and detecting an impulsive noise in a previous frame, determining a decayed noise power based on a room decay factor and a predetermined noise power of a previous impulsive noise;

determining another suppression gain based on the decayed noise power and a power of the current frame; and applying the other suppression gain to the current frame to suppress a decayed version of the impulsive noise.

8. The method according to claim 1, further comprising:

determining whether to suppress the impulsive noise or not in the current frame by deciding whether a predefined criteria is satisfied.

9. A system of impulsive noise suppression in an audio signal, comprising:

a feature determination unit configured to determine an impulsive noise related feature from a current frame of the audio signal;

a noise detection unit configured to detect an impulsive noise in the current frame based on the impulsive noise related feature; and a noise suppression unit configured to apply a suppression gain to the current frame in response to detecting the impulsive noise in the current frame so as to suppress the impulsive noise, wherein the feature determination unit is configured to determine a delta power of the current frame by comparing powers in a high frequency range of the current frame and a previous frame of the audio signal, the delta power indicating a shape of the current frame in time domain.

10. The system according to claim 9, wherein the feature determination unit is configured to determine a spectral tilt of the current frame by comparing powers in a high frequency range and a low frequency range of the current frame, the spectral tilt indicating a shape of the current frame in frequency domain.

11. The system according to claim 9, wherein the feature determination unit is configured to determine a spatial proximity from a sound source of the audio signal to a device that captures the audio signal.

12. The system according to claim 11, wherein the device captured the audio signal has a first microphone and a second microphone, and wherein the feature determination unit is configured to determine the spatial proximity by determining a correlation between a first mono signal acquired by the first microphone and a second mono signal acquired by the second microphone.

13. The system according to claim 11, the feature determination unit is further configured to:

determine a first strength of the audio signal in a first direction;

determine a second strength of the audio signal in a second direction; and determine the spatial proximity by comparing the first and second strengths.

14. The system according to claim 9, wherein the noise suppression unit is configured to:

in response to detecting the impulsive noise in the current frame, determine the suppression gain based on a predetermined noise power of a previous impulsive noise and a power of the current frame; and apply the determined suppression gain to the current frame to suppress the impulsive noise.

15. The system according to claim 9, further comprising:

a decayed power determination unit configured to determine a decayed noise power based on a room decay factor and a predetermined noise power of a previous impulsive noise in response to detecting no impulsive noise in the current frame and detecting an impulsive noise in a previous frame;

a suppression gain determination unit configured to determine another suppression gain based on the decayed noise power and a power of the current frame; and a decayed noise suppression unit configured to apply the other suppression gain to the current frame to suppress a decayed version of the impulsive noise.

16. The system according to claim 9, further comprising:

a noise suppression decision unit configured to determine whether to suppress the impulsive noise or not in the current frame by deciding whether a predefined criteria is satisfied.

17. A computer program product of impulsive noise suppression in an audio signal, comprising a computer program tangibly embodied on a non-transitory machine readable medium, the computer program containing program code for performing operations comprising:

determining an impulsive noise related feature from a current frame of the audio signal;

detecting an impulsive noise in the current frame based on the impulsive noise related feature; and in response to detecting the impulsive noise in the current frame, applying a suppression gain to the current frame to suppress the impulsive noise, wherein applying a suppression gain to the current frame in response to detecting the impulsive noise in the current frame comprises:

in response to detecting the impulsive noise in the current frame, determining the suppression gain based on a predetermined noise power of a previous impulsive noise and a power of the current frame; and applying the determined suppression gain to the current frame to suppress the impulsive noise.

18. The computer program product according to claim 17, wherein determining an impulsive noise related feature from a current frame of the audio signal comprises:

determining a spatial proximity from a sound source of the audio signal to a device that captures the audio signal.

19. The computer program product according to claim 18, wherein the device captured the audio signal has a first microphone and a second microphone, and wherein determining the spatial proximity comprises:

determining a correlation between a first mono signal acquired by the first microphone and a second mono signal acquired by the second microphone.

20. The computer program product according to claim 18, the operations further comprising:

in response to detecting no impulsive noise in the current frame and detecting an impulsive noise in a previous frame, determining a decayed noise power based on a room decay factor and a predetermined noise power of a previous impulsive noise;

determining another suppression gain based on the decayed noise power and a power of the current frame; and applying the other suppression gain to the current frame to suppress a decayed version of the impulsive noise.

* * * * *